United States Patent Office 3,804,779
Patented Apr. 16, 1974

3,804,779
CARBON SUPPORTED PALLADIUM CATALYST
Ronald A. Kent, Ridgewood, and Robert D. Evans, Hackensack, N.J., assignors to Dart Industries Inc., Los Angeles, Calif.
No Drawing. Filed Oct. 2, 1972, Ser. No. 294,057
Int. Cl. B01j 11/16
U.S. Cl. 252—447　　　　　　　　　　　　　13 Claims

ABSTRACT OF THE DISCLOSURE

Palladium on carbon hydrogenation catalysts of low sulfur content exhibiting good stability toward poisons and having high hydrogenation activity and high specificity are prepared by impregnating carbon with a slightly acidic suspension of a palladium compound, reducing and treating the palladium on carbon catalyst under basic conditions.

DISCLOSURE

This invention relates to supported palladium metal catalysts and a process for the production thereof and, in particular, to palladium on carbon catalysts having low sulfur content, exhibiting good stability toward poisons and having high specificity and high catalytic activity, which catalyst is useful in selective catalytic reduction of organic materials.

In hydrogenation and related processes, it is conventional to use a catalyst which comprises a noble metal, such as palladium or platinum, in quantities of about 0.01–25% by weight, deposited upon a support material or carrier. The aim in producing supported metal catalysts is to obtain an efficient hydrogenation catalyst of good stability toward poisons and high specificity and possessing a high activity. Some of the primary considerations affecting this aim are the nature and purity of the support, the uniformity of deposition of the metal on the support, the surface area of the catalyst and the desirably low sulfur and low anion content of the catalyst. A uniform, thin, firm and adherent coating on a support is desirable for maximum catalytic efficiency and activity.

In the prior art, palladium on carbon catalysts have been prepared by impregnation of palladium salt solutions onto carbons of unspecified sulfur content, generally without regard to pH adjustment. When it has been the practice to use basic impregnating solutions, such solutions contain very high ratios of base to palladium. The impregnations have been carried out without regard to pH, temperature, time, order of addition or sulfur content of the carbon. The basic material has usually been added all at once to a solution of the noble metal compound prior to impregnation of the carbon. Alternatively, the carbon and the base have been mixed together followed by addition of the solution of noble metal compound. These treatments precipitate the noble metal as the hydroxide and interfere with uniform impregnation of the carbon with palladium.

The prior art procedures are not satisfactory as the resulting catalysts do not possess a desirable combination of properties including good stability toward poisons, long life, high specificity and high hydrogenation activity. It is also known that the presence of large amounts of sulfur in a noble metal catalyst deleteriously affects the life of the catalyst.

It is accordingly an object of this invention to provide a palladium on carbon catalyst having good stability toward poisons, exceedingly long life, high specificity and highly acceptable activity.

Another object of this invention is to provide a novel method of preparing such palladium catalysts.

Still another object of this invention is to provide a process employing such a catalyst wherein high conversion rates are obtained.

The objects of this invention are achieved by providing a 0.05 to 25% by weight palladium on carbon catalyst having less than 300 p.p.m. sulfur content which are prepared by a method which comprises the essential steps of preparing a colloidal suspension of ionic palladium with a pH in the range of from about 5 to about 6, impregnating therewith carbon having less than about 500 p.p.m. sulfur content, reducing the carbon supported ionic palladium, and treating the resultant palladium metal on carbon with an aqueous solution under basic conditions.

It is surprising that the sulfur content of the final palladium on carbon catalyst prepared in this manner is significantly lower than the sulfur content of the original carbon, hence it is believed that this combination of steps is essential in achieving the desired result of providing an excellent hydrogenation catalyst of low sulfur content.

In the preparation of the colloidal suspension of ionic palladium any water soluble and reducible palladium compound can be used such as the nitrate, acetate, any of the halides or halide complexes. These salts are commercially available in the form of salts or aqueous solutions which are highly acidified to prevent hydrolysis. Typically the pH values of these solutions range from 0 to 3.

The important factors in determining the concentrations of palladium in the original solution and the subsequently prepared suspension are the desired concentration of palladium metal on carbon, the character of the carbon to be treated and the volume of basic solution required to adjust the pH to a value in the range of about 5 to about 6. Efficient utilization of palladium impregnating solution is obtained with a concentration low enough to disperse the palladium compound uniformly on the support but high enough to minimize or obviate the need for recovery of palladium from excess liquor. For economy, efficiency and convenience, the concentration and weight of the impregnating solution must be maintained within certain limits. Thus the initial concentration of the aqueous solution of the palladium compound is chosen such that upon adjustment of the pH the impregnating solution will contain from about 0.01 to about 2% of weight of palladium calculated as the metal.

The basic compound, while including most basic substances in the prior art, are in this invention, water-soluble basic compounds capable of raising pH to at least 6.0, preferably used in the form of a 1 to 50% aqueous solution (by weight). Examples of such substances are an alkali or alkaline earth hydroxide, preferably lithium, sodium, potassium, barium, or cesium hydroxide, nitrogen containing bases such as ammonium hydroxide and quaternary ammonium compounds, alkali carbonates or bicarbonates, preferably sodium and potassium carbonate or bicarbonates. Sodium carbonate is advantageously employed in the present invention.

The base is added slowly to the palladium solution with efficient agitation to prevent localized high concentrations of base which would cause premature palladium precipitation. The temperature should be maintained below about 50° C. and is preferably held in the range from about 10 to about 30° C. Due to the exothermic nature of the reaction, cooling may sometimes be required to maintain this temperature. The impregnating "solution" thus formed is a colloidal suspension of ionic palladium formed by partial hydrolysis of the palladium compound with the basic compound. The ionic palladium is believed to be in the form of a hydroxy substituted palladite, for example, when using palladium chloride, it is believed that the ionic palladium is in the form of hydroxyl substituted tetrachloro palladite, $PdCl_4^-$. The amount of basic compound used is sufficient to adjust the pH to a desired value in the range of at least about 5 and not above about 6 and preferably in the range of 5.3 to 5.9. The upper limit of the pH is dependent on the concentration of the palladium salt in aqueous solution and must be below the critical point of palladium hydroxide formation for the concentration being used. While the suspension is usually used soon after preparation, it is possible to delay use of the suspension for impregnation for short periods, e.g. 4 hrs., without deleterious effect on activity of the final catalyst. Since a gradual decrease of the pH value occurs during the preparation of the suspension and upon standing, it is preferred to readjust the pH to a value within the aforementioned range immediately prior to impregnation.

The carbon carrier to be used should have a low sulfur content preferably below 500 p.p.m. for greatest stability toward poisons and greatest specificity towards catalytic hydrogenation reactions. While commercial catalyst grade carbon from any source can be used and an improved catalyst of lowered sulfur content is obtained by the process of the subject invention, the use of carbon prepared from coconut shells is preferred, in view of its superior hardness and pore structure. The carbon to be used must be a highly activated (high surface area) grade to allow high catalytic activity. While powdered materials could be used in this invention it is preferred to employ the support in the form of extrudate, granules, pellets, and other particulate forms. It is preferred to use carbon particles of a coarse nature such as materials passing a U.S. Standard 4 mesh screen and retained on a U.S. Standard 10 mesh screen. To obtain a high activity catalyst the support should have a surface area in the range from about 1000 to 2000 m.$^2$/gm., a pore volume (measured from pore radius and pore distribution) from about 0.3 to about 1.0 cc./gm., and having a majority of the pores with diameters between about 50 and about 150 A. The preferred granules should be able to absorb from about 70 to about 120% of their weight of water without appearing moist.

The impregnating suspension is contacted with the carbon support preferably by trickling or spraying the suspension on the carbon, which is slowly agitated such as by slow stirring or tumbling. The amount of suspension used must be sufficient to yield a uniform distribution of ionic palladium on charcoal and is preferably sufficient to form a mass of damp granules and preferably insufficient to yield a slurry. In practice it has been found that the quantity should be less than that which theoretically can be absorbed by the carbon with a lower limit of about 60 percent of the theoretical value. The temperature of the impregnation treatment may range from 0° C. and 120° C. under sufficient pressure to maintain liquid within the carrier pores. The impregnation is conveniently carried out inthe range from about 20 to about 70° C. at atmospheric pressure. The time period of impregnation treatment varies with quantity of the carbon impregnated. It has been found that adequate results are obtained using impregnation times from a few minutes up to several hours.

The impregnated carbon is "aged" without agitation to allow full equilibration to take effect and firm bonding to occur. This is achieved by maintaining the impregnated carbon for at least one half hour at room temperature and above, usually in the range of 20 to 70° C. Preferably the aging is carried out for at least 1 hour.

To obtain the catalyst in active form, the ionic palladium absorbed on the carbon support must be reduced to metallic palladium. This can be effected by alternate means such as by a separate reducing step using a reducing agent in the solution or by drying the impregnated carbon followed by reduction by hydrogen gas. It is preferable to employ an aqueous reducing step in converting the absorbed ionic palladium to metallic palladium. Such reduction may conveniently be accomplished by reacting a stoichiometric excess of a reducing agent dissolved in water with the hydroxy substituted ionic palladium absorbed on carbon. Any conventionally used reducing agent may be used such as formaldehyde, sodium hypophosphite, sodium borohydride, hydrazine, sodium formate, tartaric acid, glucose, and other reducing monosaccharides, etc. The cited reducing agents except glucose are usually used in conjunction with a basic compound, such as any one of those previously described as used in the preparation of the suspension, in order to protect the ionic palladium from resuspension and loss during the reduction. The weight ratio of reducing agent to basic compound may vary in a wide range usually from at least about 1:4 to 4:1 and preferably in the range from about 0.5:1 to 2:1. The conditions to be employed during the reduction should be such that complete reduction is effected. For instance in the case with sodium formate as reductant, the temperature should be at least 80° C. and preferably 90° C. and above and the time a minimum of 30 minutes. The reduction is carried out under mild agitation either provided by the boiling action of the liquid or by mechanical or pneumatic means.

After the reduction step, the catalyst is recovered from solution by a conventional separation step such as filtering, centrifuging, decanting, draining. The catalyst is then subjected to a washing procedure wherein the initial washing liquor is alkaline, preferably a dilute solution, e.g. 0.1-1% by weight of sodium carbonate. In the later stages of the washing procedure the wash liquor is essentially ion free water. To increase the efficiency of the washing the procedure is carried out at temperatures between about 50° C. and about 100° C. Use of acid treatments is to be avoided being deleterious to the activity of the catalyst.

Usually, the resultant product is dried in an oven or in a vacuum drier or preferably under an oxygen-free atmosphere such as nitrogen or helium to avoid oxidation of the support with sintering of the palladium.

It is possible to prepare 0.1 to 25% weight palladium deposited on the carbon support by the method of this invention. However, catalyst containing more than 2% by weight of palladium cannot be prepared in one cycle, a cycle being defined as the sequence including impregnation, reduction and washing. For the purpose of preparing catalyst above 2% palladium concentration, multiple preparation cycles must be employed.

Promoters or activators for the palladium may also be added, usually during the impregnation step. Such promoters are usually minor amounts of other metals, metal oxides, hydroxides, etc., which are found to promote or increase the activity of the palladium in use. Such known promoters include manganese dioxide, chromic oxide, and other metals or metal oxides or hydroxides of Groups I–VIII of the Periodic Table of Elements, such as oxides or hydroxides of iron, nickel, cobalt, lithium, magnesium, aluminum, chromium, vanadium, tungsten, cerium and the like. These promoters are added in minor quantities, typically on the order of from about 0.5 to about 3% by weight calculated as the weight of metal based on weight of the total reduced catalyst. The exact proportion will vary with the amount of palladium used on the catalytic support.

For purposes of this invention, the hydrogenation activity of the catalyst is defined as the maximum rate of hydrogen utilization in the reduction of nitrobenzene (as a 0.6 molar solution in absolute methanol) at 25° C. The rate is measured as milliliters of hydrogen (STP) per minute per gram of dry catalyst. A stream of hydrogen (UHP grade) is passed through a wet test meter, then dried and passed into a shaker bottle containing a mixture of 1 gram of catalyst and 28 ml. of 0.6 molar nitrobenzene in methanol, while the bottle is shaken at 1000 cycles per minute in a water bath at 25° C. The rate of hydrogen uptake is noted at various times during the reduction. The maximum initial rate can be estimated by inspection of the data, or by graphical representation of the data, wherein the rate (ml./min./g.) is plotted against the time in minutes. For the purpose of this invention, an acceptable rate for hydrogenation activity is 20–25 ml. hydrogen/minute/gram of catalyst. An activity value of 25–30 ml./min./g. is considered very good and a value of 35–50 ml./min./g. is considered excellent. It should be noted that a sample of a commercially available catalyst prepared by a conventional prior art procedure containing 0.5% Pd on 4–8 mesh carbon support was found to have an activity in this test of only 6 ml./min./g. In the reduction of nitrobenzene with hydrogen two moles of water is formed per mole of nitrobenzene. Since water is a catalyst poison the time to achieve complete reduction of the nitrobenzene will provide some indication against stability against poisons, i.e. the shorter the time to complete the reaction the better the stability.

The following examples will serve to further illustrate the invention:

EXAMPLE 1

A 600 ml. aqueous solution containing 6.9 gms. palladium chloride was treated at room temperature and with stirring by slow addition of 102.5 ml. of 10% by weight sodium carbonate solution and the mixture was stirred for 2 hours. At the end of the stirring period the solution had a pH of 5.85.

This solution was used immediately and sprayed onto 1050 gms. of a 4–8 mesh activated coconut carbon (obtained from Barneby Cheney) in a rotating mixer. The carbon which was obtained from Barneby Cheney contained 200 p.p.m. sulfur and had a measured water absorption (which is a practical measure of pore volume) of about 90% by weight. The impregnated mixture was aged at room temperature (26° C.) for 68 hours without agitation. To the impregnated mixture was added 210 ml. of 10% by weight sodium carbonate and 210 ml. of 10% by weight aqueous sodium formate solution and sufficient water (1600 ml.) to cover the carbon. The mixture was heated to 90° C. during a period of 30 minutes and maintained at about 90–95° C. for one hour, at which time the reduction of the metal was complete. The slurry was filtered and washed 4 times with 1000 ml. of 1% by weight aqueous sodium carbonate solution at 50° C., then washed 4 times with 1000 ml. of distilled water at about 50° C. The catalyst was dried at 90° C. in a vacuum oven. The recovered 0.5% by weight palladium on charcoal catalyst weighing 910 gms. had a sulfur content of 150 p.p.m. which corresponded to a 25% reduction in sulfur content. The hydrogenation activity was measured to be 51 ml./min./g. with a vary short induction activity. The time to complete the reduction was 16 minutes.

Sulfur analyses were conducted by gasometric iodometry on the LECO (Laboratory Equipment Co.) sulfur analysis apparatus.

EXAMPLE 2

A set of experiments were run to demonstrate the effect of mixing the pH of the impregnating suspensions on activity. The catalysts which all contained 0.5% Pd were prepared under the conditions of Example 1 except that the amounts of sodium carbonate solution used to prepare the impregnating suspensions were varied to obtain the desired pH levels. Also all catalysts were aged at 70° C. for 2 hours rather than at 26° C. for 68 hours. The carbon support was similar to that of Example 1 but contained 350 p.p.m. of sulfur. The following data were obtained:

| Experiment | pH of suspension | Initial rate, ml./min./gm. | Completion time, minutes |
|---|---|---|---|
| A | 5.9 | 44 | 16 |
| B | 5.8 | 46 | 19 |
| C | 5.7 | 28 | 32 |
| D | 5.6 | 28 | 29 |
| E | 5.5 | 25 | 30 |
| F | 5.4 | 21 | (1) |
| G | 5.3 | 27 | 29 |
| H | 5.2 | 13 | (1) |
| I | 5.1 | 14 | (1) |
| J | 5.0 | 11 | (1) |
| K | 4.9 | 6 | (1) |

[1] Not measured.

Sulfur determinations were carried out on the catalysts of Experiment B and G and amounted to 270 p.p.m. for B and 175 p.p.m. for G, corresponding to about 23 and 50 percent reduction in sulfur respectively.

EXAMPLE 3

The catalyst of this example was prepared in the same manner as that employed in the preparation of Catalyst B of Example 2, except that the coconut carbon support, which was a Pittsburgh PCB had a water absorbency of 70 weight percent. The initial activity of the catalyst was found to be 35 ml./min./g.

EXAMPLE 4

The catalyst of this example was prepared according to the procedure of Example 2A (pH 5.9) except that the concentration of palladium in the suspension was doubled leading to a 1.0% by weight palladium metal on carbon catalyst. The hydrogenation activity of the material was 51 ml./min./g. The sulfur content of the catalyst was 85 p.p.m. sulfur as compared with 240 p.p.m. sulfur in the carbon used as support in the catalyst preparation.

EXAMPLE 5

The procedure of Example 2D (pH 5.6) was followed for the preparation of the catalyst of this example except that the concentration of palladium was 40% of that used in Example 2 leading to a 0.19% by weight palladium on carbon catalyst. The hydrogenation activity of the catalyst was 31 ml./min./g.

EXAMPLE 6

Three comparative experiments were made to demonstrate the effects on catalyst activity of initial pH of the impregnating suspension and of actual pH at the time of impregnation. Three catalysts, L, M and N, were prepared each containing 0.5 percent by weight of palladium metal.

In the preparation of the catalysts 30 ml. of a 1% by weight palladium chloride solution was diluted to 400 ml. To an 80 ml. aliquot of the solution was slowly added 6.8 ml. of 10% sodium carbonate to obtain a suspension having a pH of 5.05. 100 gms. of coconut shell carbon was immediately impregnated with the suspension, after which aging at 70° C. for 2 hours was carried out. The catalyst (L) was then reduced at 95±5° C. for one hour with 20 ml. of 10% sodium formate, 20 ml. of 10% sodium carbonate. 60 ml. of water was also added to cover the catalyst. The catalyst was washed 4 times with a 1% solution of sodium carbonate and 4 times with distilled water at 50±5° C. Finally the catalyst was dried at 90° C. in a vacuum oven for 16 hours.

To a 160 ml. aliquot of the palladium chloride solution was added 19 ml. of 10% sodium carbonate. The resulting suspension having a pH of 5.7 was divided into two equal parts, one of which was used immediately to impregnate 100 gms. of carbon. The same procedure was subsequently followed in the preparation of the catalyst (M) as described in connection with catalyst L.

The remaining part of the suspension was stirred for one hour at 28° C. until the pH had dropped to 5.05. Catalyst N was prepared according to the above procedures using this suspension.

Initial activities were determined on each of the catalysts with the following results:

| Catalyst: | Initial activity, ml./min./g. |
|---|---|
| L | 31 |
| M | 55 |
| N | 52 |

The comparative examples show that it is the initial high pH adjustment which is important in achieving high activity and not the actual pH at the time of impregnation. Experiments M and N demonstrate that a short delay between preparation of the suspension and the impregnation does not exert an excessively deleterious effect on catalyst activity.

The catalysts of this invention reduce nitrobenzene to aniline at various substantial rates as indicated above; moreover, the reactions are complete, straightforward and without tar formation, yields are excellent and the quality of the product excellent. Since the reduction of nitrobenzene is known to proceed stepwise, the lack of deposits of intermediates on the catalyst is noteworthy.

The catalysts of this invention possess a desirable combination of properties including high hydrogenation activity, good stability toward poisons and high specificity.

The caalysts of this invention are useful for the reactions known to be catalyzed by palladium. Specific reactions employing these catalysts include the reduction of para-carboxy-benzaldehyde to para-toluic acid, conversion of dimethyl nitrosoamine to dimethylhydrazine, the reduction of d-oximinopropiophenone to norephedrine, and the reduction of dicyanobutene to adiponitrile. It is to be especially noted that in the selective reduction of 2-cyanobutene, the CN groups are not affected. The catalysts show high activity and good selectivity in the reduction of impurities in terephthalic acid, which allows a convenient method of purification of the acid.

Thus, while having described the invention in detail, it will be understood that certain variations and modification may be made without departing from the spirit and scope of the invention as herein described and defined in the appended claims.

What is claimed is:

1. A process for producing a carbon supported palladium catalyst comprising:
    adding a basic compound to an aqueous acidic solution of a palladium compound to form a colloidal ionic palladium suspension having a pH in the range from about 5 to about 6;
    impregnating a particulate activated carbon containing less than 500 p.p.m. sulfur with said suspension;
    aging the impregnated carbon for at least about one-half hour;
    reducing the ionic palladium deposited on said carbon to metallic palladium, and washing the palladium on carbon at least once with an alkaline wash liquor.

2. A process according to claim 1 wherein the palladium compound is a palladium halide.

3. A process according to claim 2 wherein the palladium halide is palladium chloride.

4. A process according to claim 1 wherein the initial pH of the suspension is 5.3 to 5.9.

5. A process according to claim 1 wherein the basic compound employed in forming the colloidal ionic suspension is an alkali metal carbonate.

6. A process according to claim 1 wherein the aging is carried out for at least about one hour at 20 to 70° C.

7. A process according to claim 1 wherein the reduction is carried out with an aqueous reducing agent.

8. A process according to claim 7, wherein a basic compound is added to the aqueous reducing agent.

9. A process according to claim 7 wherein the reduction is carried out with an aqueous solution of an alkali metal formate at a temperature of at least 80° C. for at least 30 minutes.

10. A process according to claim 1 wherein the alkaline wash liquor is an aqueous solution of an alkali metal carbonate.

11. A process according to claim 1 wherein subsequent to the alkaline wash the palladium on carbon is further washed with ion-free water.

12. A process according to claim 1 wherein the particulate activated carbon is a coconut carbon.

13. A carbon supported palladium catalyst having less than 300 p.p.m. sulfur prepared by the process which comprises:
    adding a basic compound to an aqueous acidic solution of a palladium compound to form a colloidal ionic palladium suspension having a pH in the range from about 5 to about 6;
    impregnating a particulate activated carbon containing less than 500 p.p.m. sulfur with said suspension;
    aging the impregnated carbon for at least about one-half hour;
    reducing the ionic palladium deposited on said carbon to metallic palladium, and washing the palladium on carbon at least once with an alkaline wash liquor.

References Cited

UNITED STATES PATENTS

| | | | |
|---|---|---|---|
| 3,271,327 | 9/1966 | McEvoy et al. | 252—447 X |
| 3,138,560 | 6/1964 | Keith et al. | 252—447 |
| 3,328,465 | 6/1967 | Spiegler | 252—447 X |
| 3,458,576 | 8/1969 | Bryan | 252—447 X |
| 2,692,295 | 10/1954 | Peters | 252—447 X |

PATRICK P. GALVIN, Primary Examiner

U.S. Cl. X.R.

260—580

PO-1050
(5/69)

UNITED STATES PATENT OFFICE
CERTIFICATE OF CORRECTION

Patent No. __3,804,779__          Dated __April 16, 1974__

Inventor(s) __Ronald A. Kent and Robert D. Evans__

It is certified that error appears in the above-identified patent and that said Letters Patent are hereby corrected as shown below:

Column 2, line 63-64      "quaternary" should read --quarternary--

Column 3, line 17,        "$PdCl_4^-$" should read --$PdCl_4^=$--

Column 3, line 70,        "inthe" should read --in the--

Column 7, line 30,        "caalysts" should read --catalysts--

Column 8, line 54         "Patrick P. Galvin" should read
-- Patrick P. Garvin --.

Signed and sealed this 1st day of October 1974.

(SEAL)
Attest:

McCOY M. GIBSON JR.
Attesting Officer

C. MARSHALL DANN
Commissioner of Patents

May 21, 1974